United States Patent [19]

Shibata

[11] Patent Number: 5,351,158
[45] Date of Patent: Sep. 27, 1994

[54] MAGNETORESISTANCE EFFECT THIN FILM HEAD WITH INTERCONNECTED ELECTRODE STRUCTURE

[75] Inventor: Takuji Shibata, Miyagi, Japan

[73] Assignee: Sony Corporation, Tokyo, Japan

[21] Appl. No.: 706,257

[22] Filed: May 28, 1991

[30] Foreign Application Priority Data

May 30, 1990 [JP] Japan .................. 2-140685

[51] Int. Cl.$^5$ ............................................. G11B 5/39
[52] U.S. Cl. .................................................. 360/113
[58] Field of Search ............... 360/113; 338/32 R; 324/252

[56] References Cited

U.S. PATENT DOCUMENTS

| 4,503,394 | 3/1985 | Kawakami et al. | 338/32 R |
| 4,914,538 | 4/1990 | Howard et al. | 360/113 |
| 4,922,360 | 5/1990 | Takano et al. | 360/113 |
| 4,967,298 | 10/1990 | Mowry | 360/113 |
| 4,987,509 | 1/1991 | Gill et al. | 360/113 |
| 5,005,096 | 4/1991 | Krounbi et al. | 360/113 |
| 5,081,554 | 1/1992 | Das | 360/113 |
| 5,097,371 | 3/1992 | Somers | 360/113 |
| 5,097,372 | 3/1992 | Fukazawa et al. | 360/113 |
| 5,103,553 | 4/1992 | Mallary | 360/113 |
| 5,111,352 | 5/1992 | Das et al. | 360/113 |
| 5,159,511 | 10/1992 | Das | 360/113 |

FOREIGN PATENT DOCUMENTS

| 0355044 | 2/1990 | European Pat. Off. |
| 0459404 | 12/1991 | European Pat. Off. |
| 3832449 | 4/1989 | Fed. Rep. of Germany |
| 62274040 | 5/1989 | Japan |
| 62274042 | 5/1989 | Japan |

Primary Examiner—Stuart S. Levy
Assistant Examiner—Paul J. Ditmyer
Attorney, Agent, or Firm—Hill, Steadman & Simpson

[57] ABSTRACT

A magnetoresistance-effect thin film head including a substrate, a magnetic field sensing element provided on the substrate, an electrode layer having portions respectively extending from the opposite ends of the magnetic field sensing element to apply a sense current to the magnetic field sensing element so that the sense current will flow in the direction of a signal magnetic field, an insulating layer formed over the magnetic field sensing element, a bias magnetic field creating conductor formed on the insulating layer so as to extend across the magnetic field sensing element, and a magnetic shielding layer shielding the magnetic field sensing element. At least a portion of the electrode layer and a portion of the bias magnetic field creating conductor are included in a conductive pattern.

1 Claim, 9 Drawing Sheets

MAGNETORESISTANCE EFFECT THIN FILM HEAD WITH INTERCONNECTED ELECTRODE STRUCTURE

BACKGROUND OF THE INVENTION

1. Field of the Invention

The present invention relates to a magnetoresistance-effect thin film head and, more specifically, to a magnetoresistance-effect thin film head capable ensuring high reliability even in operation in a high-temperature, high-humidity environment.

2. Description of the Prior Art

Figure 12:
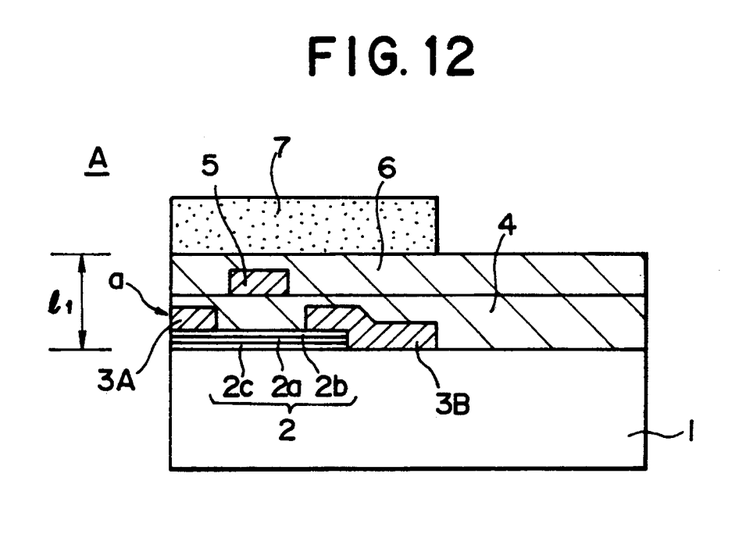
FIGS. 12 and 13 are sectional views of conventional magnetoresistance-effect thin film heads.

FIG. 12 shows a previously proposed magnetoresistance-effect thin film head A comprising a substrate 1, a magnetic field sensing element 2, i.e., a magnetoresistance-effect element (hereinafter referred to as "MR element") formed on the substrate 1 perpendicularly to the sliding surface a of a magnetic recording medium, a conductive layer having electrodes 3A and 3B connected to the front and rear ends of the MR element 2 to supply a sense current to the MR element 2 in the direction of a signal magnetic field created by the magnetic recording medium. The thin film head A employs a bias magnetic field creating conductor (hereinafter referred to simply as "bias conductor") 5 formed on an insulating layer 4 formed over the MR element 2 so as to extend across the MR element 2 as means for applying a bias magnetic field. An optimum bias magnetic field can be created by varying the current flowing through the bias conductor 5. In FIG. 12, indicated at 6 is an insulating layer, at 7 is a magnetic shielding layer formed over the MR element to enhance the resolution, and $l_1$ is a gap. The construction of the MR element 2 consisting of two magnetic films 2b and 2c, and an intermediate layer 2a formed between the magnetic films 2b and 2c is able to avoid perfectly the generation of Barkhausen noise, namely, noise attributable to domain wall displacement.

However, in fabricating the thin film head A of FIG. 12, the bias conductor 5 and the electrode layer having the electrodes 3A and 3B need to be formed separately. Therefore, the thin film head A has a complicated multilayer structure and has difficulty in reducing the gap to increase line recording density.

Figure 13:
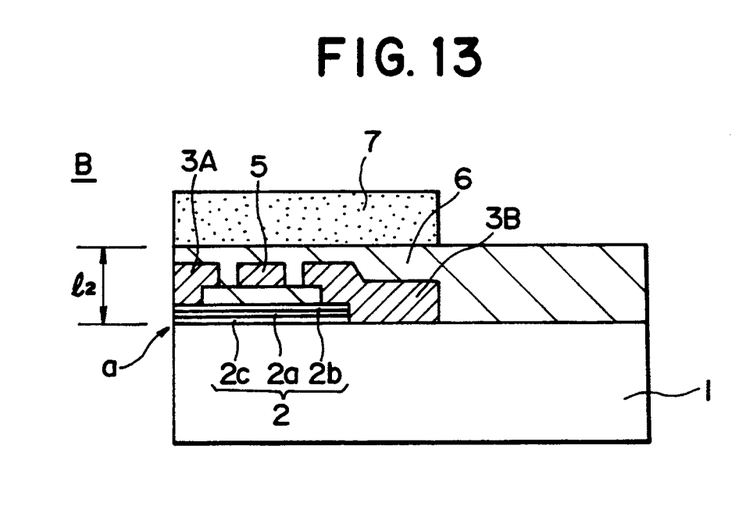

On the other hand, since a sense current is supplied in a direction perpendicular to the sliding surface a for the foregoing thin film head provided with the two-layer MR element 2, the electrodes 3A and 3B of the MR element 2, and the bias conductor 5 can be formed simultaneously as shown in FIG. 13 (Japanese Patent Laid-open (Kokai) No. 1-116912). This thin film head B can be constructed so that the gap $l_2$ thereof is smaller than the gap $l_1$ of the thin film head A of FIG. 12 ($l_1 > l_2$). However, the size of the MR element 2 of the thin film head B of FIG. 13 must be reduced to increase the recording density, and hence the contact areas and widths of the electrodes 3A and 3B cannot be increased. Therefore, if the electrodes 3A and 3B of the MR element 2, and the bias conductor 5 are formed simultaneously, heat and noise increase due to increase in the resistance. Furthermore, since the width of a portion of the bias conductor 5 extending over and across the MR element 2 is small, the bias conductor 5 is unable to apply a bias magnetic field uniformly to the MR element 2.

The electrodes 3A and 3B of the foregoing thin film head provided with the MR element 2 having one side exposed in the sliding surface a, and the front electrode 3A having one side exposed in the sliding surface a are formed, in most cases, of a metal having a comparatively low resistance, such as Au, Cu or Al, to suppress heat generation and noise generation. However, Au is expensive and is liable to come off the MR element 2 during machining for forming the sliding surface a because Au is soft and inferior in adhesive property, Cu is readily oxidized, inferior in moisture resistance and corrosion resistance, and unreliable in use in a high-temperature, high-humidity environment, and the same may be said of Al.

SUMMARY OF THE INVENTION

In view of the foregoing problems, it is an object of the present invention to provide a magnetoresistance-effect thin film head having a gap of a reduced size and capable of dealing with high-density recording.

Another object of the present invention is to provide a magnetoresistance-effect thin film head capable of performing its intended function in a high reliability even under high-temperature, high-humidity environmental conditions.

In one aspect of the present invention, a magnetoresistance-effect thin film head comprises a substrate (12) a magnetic field sensing element (13) formed on the substrate (12), an electrode layer (15) having electrodes extending respectively from the opposite ends of the magnetic field sensing element (13) to supply a sense current to the magnetic field sensing element (13) in the direction of a signal magnetic field, an insulating layer (14) formed over the magnetic field sensing element (13), a bias magnetic field creating conductor (16) formed on the insulating layer (14) so as to extend across the magnetic field sensing element (13), and a magnetic shielding layer (19) shielding the magnetic field sensing element (13), and is characterized in that a conductive pattern (17) includes at least a portion of the electrode layer (15) and a portion of the bias magnetic field creating conductor (16).

In another aspect of the present invention, a magnetoresistance-effect thin film head comprises a substrate (12) a magnetic field sensing element (13) formed on the substrate (12), an electrode layer (15) having electrodes extending respectively from the opposite ends of the magnetic field sensing element (13) in the direction of a signal magnetic field, an insulating layer (14) formed over the magnetic field sensing element (13), a bias magnetic field creating conductor (16) formed on the insulating layer (14) so as to extend across the magnetic field sensing element (13), and a magnetic shielding layer (19) shielding the magnetic field sensing element (13), and is characterized in that the electrode layer (15) consists of a principal metal conductor (27) and a moisture-resistant conductor (26), and a portion of the electrode layer (15) contiguous with the sliding surface is formed of the moisture-resistant conductor (16).

The magnetoresistance-effect thin film head in the first aspect of the present invention has a simple layered structure because a portion of the electrode layer (15) of the magnetic field sensing element (13) and a portion of the bias magnetic field creating conductor (16) are included in the conductive pattern (17), and hence the gap can be formed in a reduced size. Since the conductive pattern (17) has a portion of the bias magnetic field creating conductor (16), the bias magnetic field creating conductor (16) covers the end portion of the magnetic field sensing element (13) and, consequently, a bias magnetic field can uniformly be applied to the magnetic field sensing element (13). Since the area of contact between the magnetic field sensing element (13) and the electrode layer (15) is sufficiently large and the electrode layer (15) has a sufficiently large width even if the magnetic field sensing element (13) is formed in a reduced size, heat generation and noise generation are suppressed, and hence the thin film head is able to deal with high-density recording. Forming the conductive pattern (17) so as to include a portion of the electrode layer (15) and a portion of the bias magnetic field creating conductor (16) reduces the number of terminals of the thin film head.

Since the magnetoresistance-effect thin film head in the second aspect of the present invention is provided with the electrode layer (15) of the magnetic field sensing element (13) having a portion contiguous with the sliding surface formed of the moisture-resistant conductor (26), the electrode layer (15) is protected from oxidation and corrosion, so that the magnetoresistance-effect thin film head performs its function at a high reliability even under high-temperature, high-humidity environmental conditions.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Magnetoresistance-effect thin film heads embodying the present invention will be described hereinafter with reference to the accompanying drawings.

First Embodiment

Figure 1:
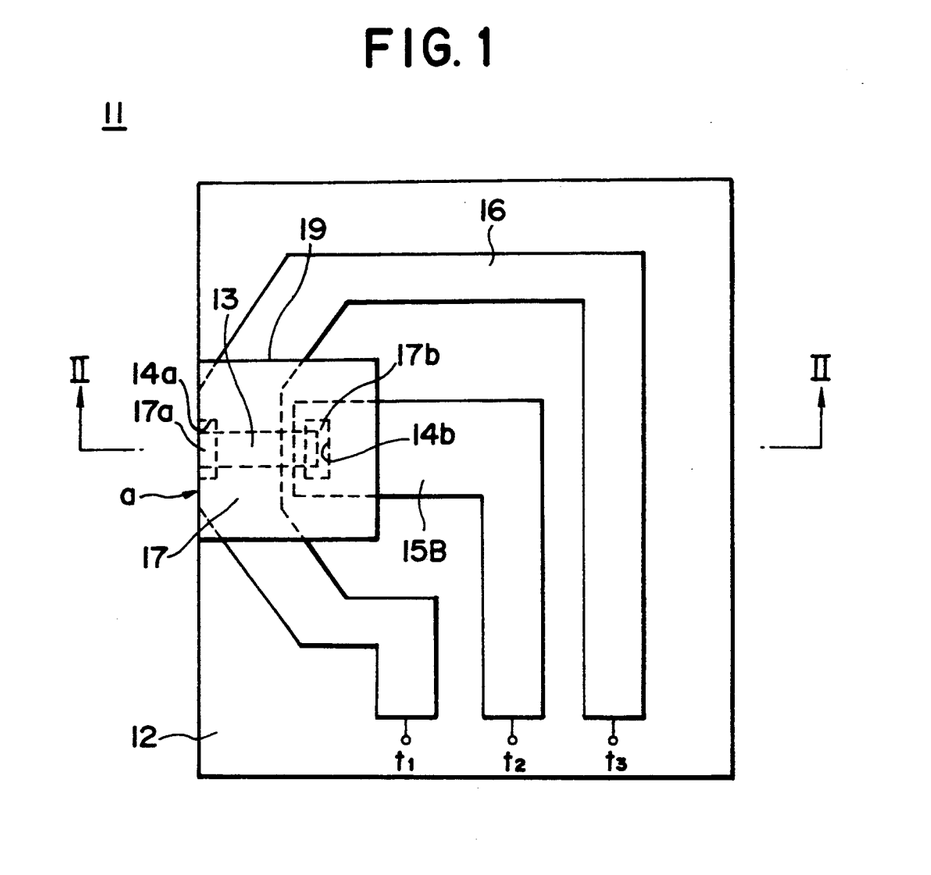
FIGS. 1 and 2 are a plan view and a sectional view taken on line A—a in FIG. 1, respectively, of a magnetoresistance-effect thin film head in a first embodiment according to the present invention.
Figure 2:
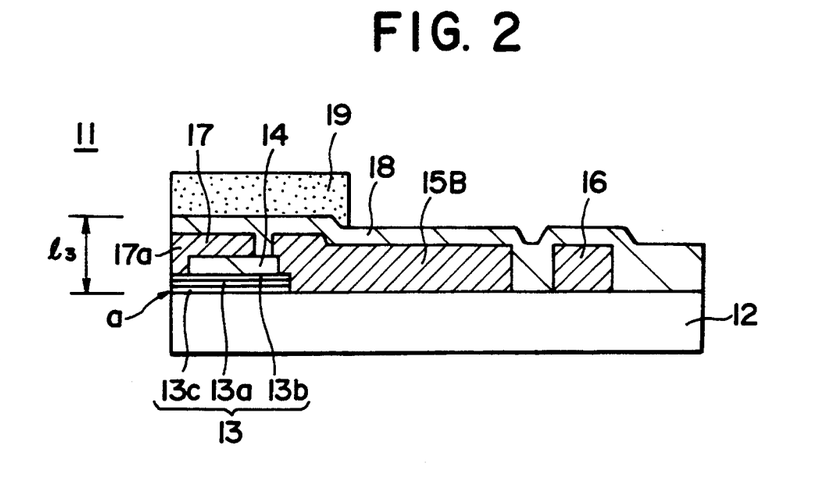

In a magnetoresistance-effect thin film head in a first preferred embodiment according to the present invention, at least a portion of a conductor of a electrode layer 15 connected either to the front end or rear end of a MR element, and a portion of a bias conductor (16) are included in a conductive pattern 17, and a terminal connected to the conductive pattern 17 is grounded. Referring to FIGS. 1 and 2, a thin film head 11 of such a construction having a sliding surface a which faces a magnetic recording medium, such as a magnetic disk, is fabricated by forming a MR element 13 on a substrate 12 so as to extend in a direction perpendicular to the sliding surface a, coating the MR element 13 with an insulating layer 14, forming contact holes 14a and 4b in the insulating layer 14 at positions corresponding respectively to the front and rear ends of the MR element 13, and simultaneously forming a rear electrode 15B connected through the contact hole 14b to the rear end of the MR element 13, a bias conductor 16, and a conductive pattern 17 having a portion forming a front electrode, not shown, connected through the contact hole 14a to the MR element 13 and a portion forming a portion of the bias conductor 16 in a single process. A portion of the bias conductor 16 included in the conductive pattern 17 extends over and across the MR element 13. To enhance the resolution of the thin film head, the MR element 13 is shielded by a magnetic shielding layer 19 formed on an insulating layer 18. The MR element 13 consists of two magnetic films 13b and 13c and a nonmagnetic intermediate layer 13a formed between the two magnetic films 13b and 13c. Such a construction of the MR element 13 suppresses the generation of Barkhausen noise, i.e., noise attributable to domain wall replacement. The front end of the MR element 13, and a portion of the conductive pattern 17 corresponding to the front end of the MR element 13 are exposed in the sliding surface a. A terminal $t_1$ connected to the conductive pattern 17 is connected to a ground potential Vss, a terminal $t_2$ connected to the rear electrode 15B connected to the rear end of the MR element 13 is connected to an amplifier, not shown, to apply a predetermined voltage to the terminal $t_2$ by a constant-voltage power supply. A predetermined voltage is applied to a terminal $t_3$ connected to the bias conductor 16.

Figure 3:
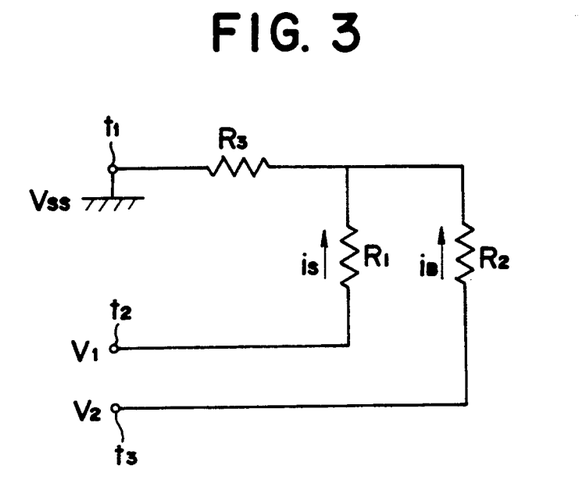
FIG. 3 is a circuit diagram of an equivalent circuit whose behavior is identical with that of the magnetoresistance-effect thin film head of FIG. 1.

A sense current $i_S$ supplied through a contact portion 17a of the conductive pattern 17 and the rear electrode 15B to the MR element 13 of the thin film head 11 in the direction of a signal magnetic field created by the magnetic disk, and a bias current $i_B$ is supplied through the bias conductor 16 and the conductive pattern 17 to the MR element 13 in a direction substantially perpendicular to the direction of flow of the sense current $i_S$. FIG. 3 shows an equivalent circuit whose behavior is identical with that of the thin film head 11. Referring to FIG. 3, $R_1$ represents the resistance of the MR element 13 and the rear electrode 15B, $R_2$ represents the resistance of the bias conductor 16, i.e., a portion of the bias conductor 16 before the conductive pattern 17, $R_3$ represents the resistance of the conductive pattern 17. An output variation $\Delta V$ in the output of the MR element 13 resulting from a resistance variation $\Delta R$ in the resistance of the MR element 13 caused by the variation of magnetic flux applied to the MR element 13 is expressed by:

$$\Delta V = i_S(R_1 + \Delta R) + (i_S + i_B)R_3 - \{i_S R_1 + (i_S + i_B)R_3\} \quad (1)$$
$$= I_S \Delta R$$

The output variation $\Delta V$ corresponds to the variation of the potential difference between the terminal $t_1$ connected to the conductive pattern 17 and the terminal $t_2$ connected to the rear electrode 15B of the MR element 13 when the current is maintained constant.

It is obvious from Expression (1) that the output variation of the thin film head 11 is the same as that of the conventional thin film head. Accordingly, voltages to be applied respectively to the terminal $t_2$ of the rear electrode 15B connected to the rear end of the MR element 13 and the terminal $t_3$ of the bias conductor 16 can individually be determined, the bias current $i_B$ flows through the conductive pattern 17 across the MR element 13 if $i_S \neq -i_B$ to apply an appropriate bias magnetic field to the MR element 13. If either the voltage $V_1$ applied to the terminal $t_2$ of the rear electrode 15B of the MR element 13 or the voltage $V_2$ applied to the terminal $t_3$ of the bias conductor 14 is a negative voltage, the current $|i_S - i_B|$ that flows through the conductive pattern 17 having the resistance $R_3$ can be reduced to suppress the generation of heat and noise.

In fabricating the thin film head 11, the electrodes of the MR element 13, and the bias conductor are formed simultaneously by a single process, the thin film head 11 can be formed in a simple layered construction and has a small gap $l_3$. Since the front electrode of the MR element 13 and a portion of the bias conductor are included in the conductive pattern 17, a portion 17a of the conductive pattern 17 in contact with the front end of the MR element 13, and a contact portion 17b of the conductive pattern 17 in contact with the rear end of the MR element 13, i.e., a portion of the rear electrode 15B in contact with the MR element 13, can be formed in a sufficiently large contact area even if the MR element 13 is formed in a comparatively small size to deal with high-density recording. Since a portion of the conductive pattern 17 serving as the bias conductor covers the MR element 13 including the front end of the MR element 13, a bias magnetic field can be applied uniformly to the MR element 13. Basically, the construction of the thin film head thus fabricated, prevents layer short between the electrode layer for the MR element 13, and the bias conductor, which enhances the reliability of the thin film head. Furthermore, the thin film head in accordance with the present invention has three terminal where as the conventional thin film head has four terminals.

Second Embodiment

Figure 4:
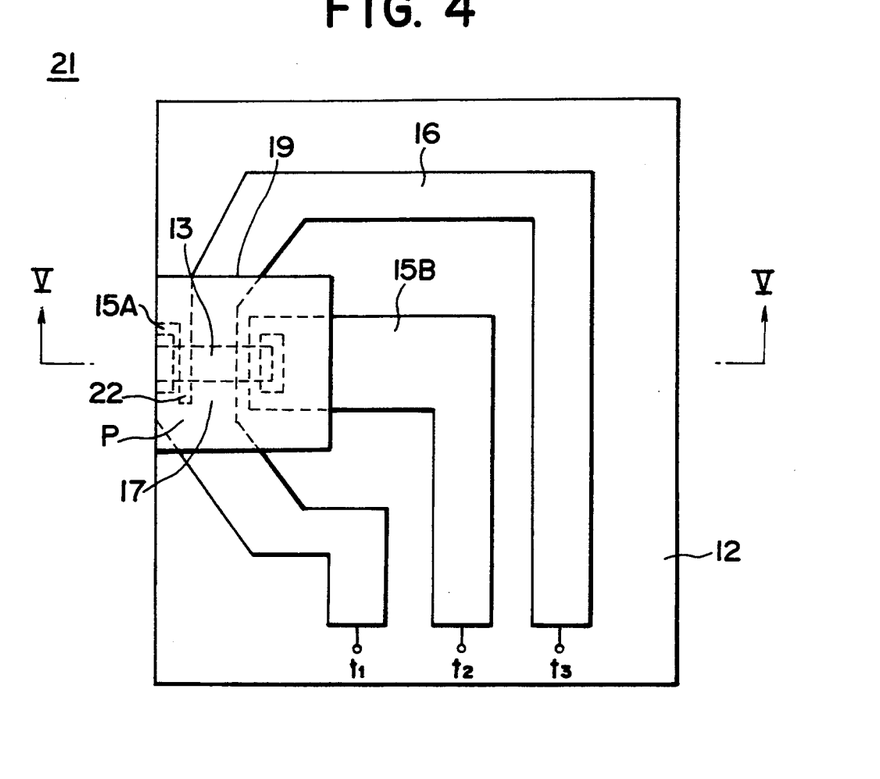
FIGS. 4 and 5 are a plan view and a sectional view taken on line B—B in FIG. 4, respectively, of a magnetoresistance-effect thin film head in a second embodiment according to the present invention.
Figure 5:
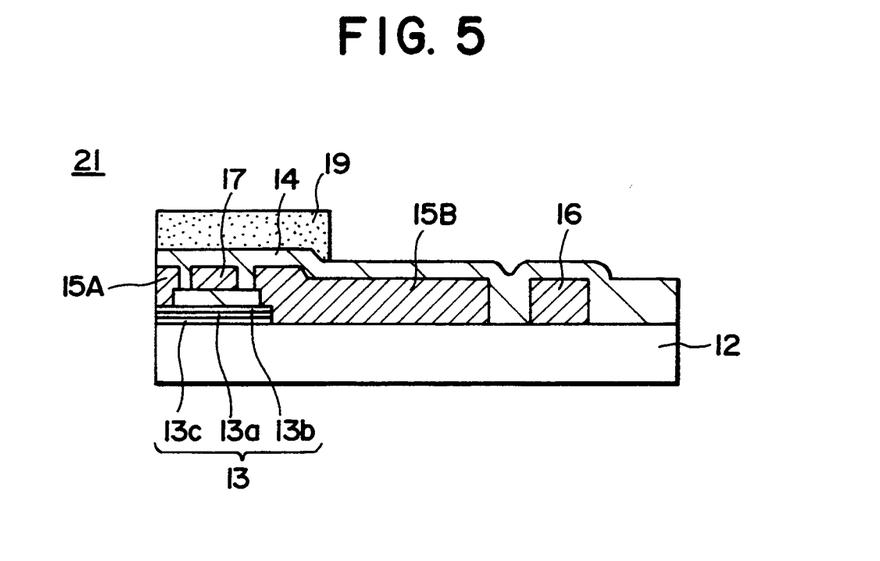

FIGS. 4 and 5 show a thin film head 21 in second embodiment according to the present invention. The thin film head 21, similarly to the thin film head 11 in the first embodiment shown in FIGS. 1 and 2, has a front electrode connected to the front end of a MR element 13 and included in a conductive pattern 17 and is identical in construction with the thin film head 11 shown in FIGS. 1 and 2, except that a slit 22 is formed in the conductive pattern 17 of the thin film head 21 to separate a portion 15A of the conductive pattern 17 serving as the front electrode of the MR element 13, and a portion 16a of the conductive pattern 17 serving as a bias conductor from each other and to join the portion 15A to a bias conductor 16 at a junction p at a position outside an area corresponding to the MR element 13 so that a sense current $i_S$ and a bias current $i_B$ join at a position outside the area corresponding to the MR element 13.

In the thin film head 21, the bias current $i_B$ is not disturbed while the same flows over the MR element 13, so that a bias magnetic field can further satisfactorily be applied to the MR element 13. Since the conductive portions 15A and the bias conductor 16 joins at a position very close to the MR element 13, increase in the resistance of the conductive portion 15A connected to the front end of the MR element 13 is insignificant. The thin film head 21 has the same advantages as those of the thin film head 11 shown in FIG. 1.

Third Embodiment

Figure 6:
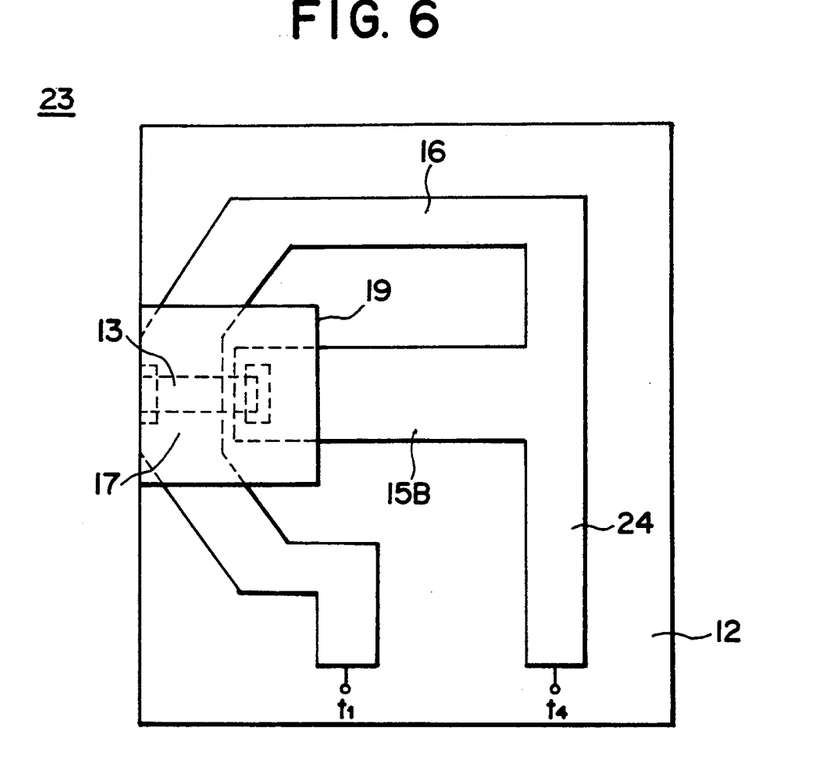
FIG. 6 is a plan view of a magnetoresistance-effect thin film head in a third embodiment according to the present invention.
Figure 7:
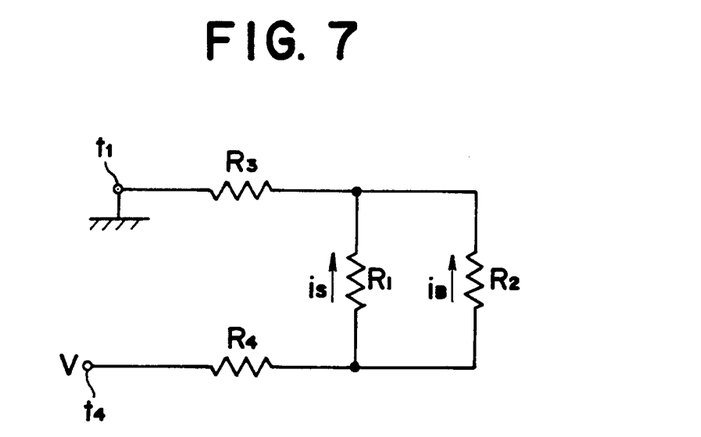
FIG. 7 is a circuit diagram of an equivalent circuit whose behavior is identical with that of the magnetoresistance-effect thin film head of FIG. 6.

FIG. 6 shows a thin film head 23 in a third embodiment according to the present invention. The thin film head 23 is identical in construction with the thin film head 11 shown in FIG. 1, except that, in the thin film head 23, a portion of a rear electrode 15B connected to the rear end of a MR element 13 and a portion of a bias conductor 16 are included in a conductive pattern 24, and a terminal $t_4$ is connected to the conductive pattern 24 as a common terminal for the rear electrode 15B and the bias conductor 16. FIG. 7 shows an equivalent circuit whose behavior is identical with that of the thin film head 23. In FIG. 7, resistances $R_1$, $R_2$ and $R_3$ corresponds respectively to those in FIG. 3, and $R_4$ represents the resistance of a portion of the conductive pattern 24 serving as the rear electrode. Although the thin film head 23 does not allow the individual selection of a bias current $i_B$ to be supplied to the bias conductor 16 and a sense current $i_S$ to be supplied to the MR element 13, the thin film head 23 has only two terminals $t_1$ and $t_4$. Other advantages of the thin film head 23 are the same as those of the thin film head 11 shown in FIG. 1.

Fourth Embodiment

Figure 8:
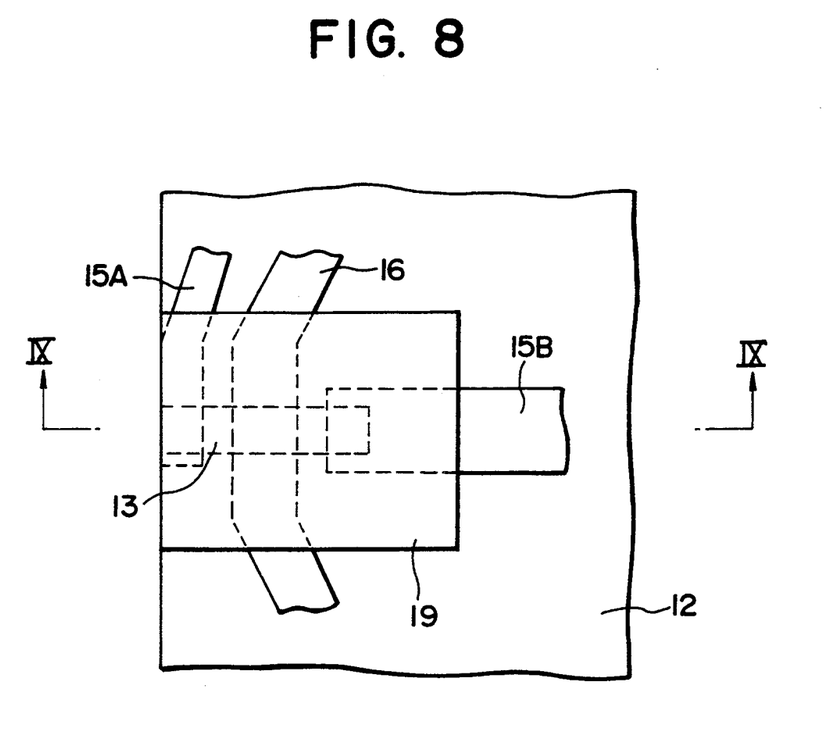
FIG. 8 is a plan view of a magnetoresistance-effect thin film head in a fourth embodiment according to the present invention.
Figure 9A:
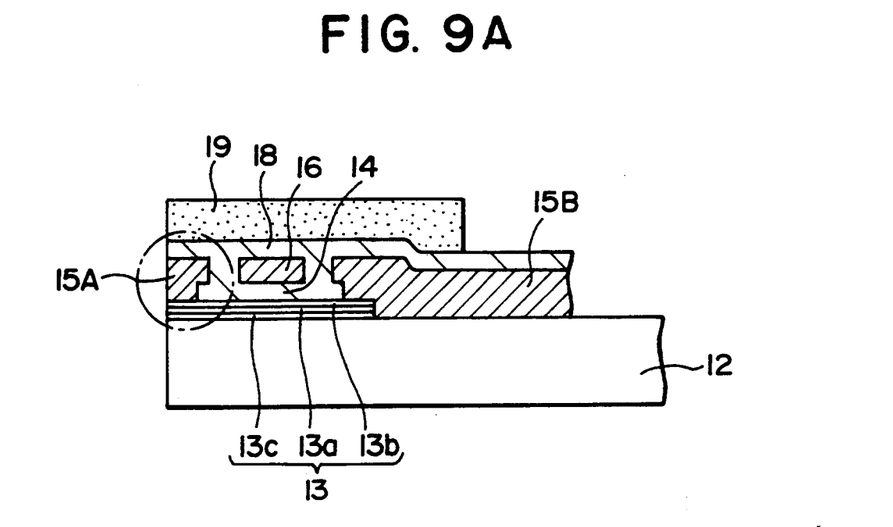
FIGS. 9A and 9B are a sectional view taken on line C—C in FIG. 8, and an expanded cross-sectional view, respectively.
Figure 9B:
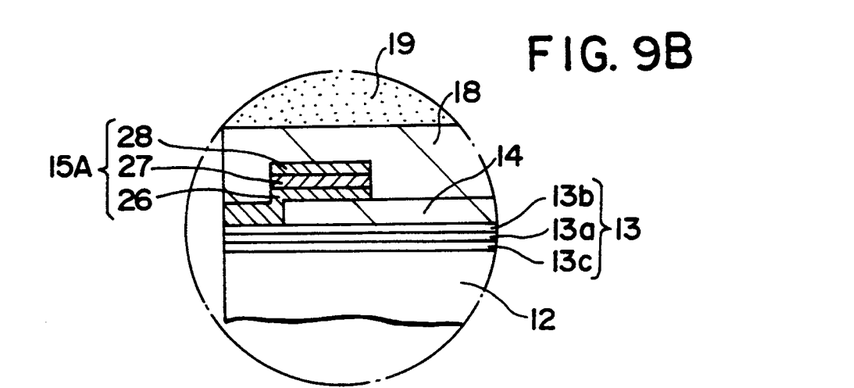

FIGS. 8 and 9 shows a thin film head 25 in a fourth embodiment according to the present invention. The thin film head 25 is capable of functioning at a high reliability under high-temperature, high-humidity environmental conditions. Basically, the thin film head 25 has an electrode layer 15 for a MR element 13, consisting of a metal layer having a comparatively small resistivity and a moisture-resistant conductive layer, and a portion of the electrode layer contiguous with the sliding surface a of the thin film head 25 is formed only of a portion of the moisture-resistant conductive layer.

Referring to FIGS. 8 and 9, the MR element 13 of the said two-layer construction is formed on a substrate so as to extend in a direction perpendicular to the sliding surface. An electrode layer 15 for supplying a sense current $i_S$ to the MR element in the direction of a signal magnetic field has a front electrode 15A connected to the front end of the MR element 13 and a rear electrode 15B connected to the rear end of the MR element 13. A bias conductor 16 is formed so as to extend across the MR element 13 on an insulating layer 14 covering the MR element 13. A magnetic shielding layer 19 is formed on an insulating layer 18 so as to shield the MR element 13. The front electrode 15A and the rear electrode 15B connected to the MR element 13 consist of a moisture-resistant conductive layer 26 formed of a moisture-resistant material, such as Ti, Mo, W, Cr, SuS or C, and a principal conductive layer 27 formed of a metal having a comparatively small resistivity, such as Cu, Au or A1. If the principal conductive layer 27 is formed of a metal having an inferior adhesive property, such as Au, a bonding metal layer 28, such as a Ti layer or a Mo layer, is formed on the principal conductive layer 27. A portion of the front electrode 15A contiguous with the sliding surface a, namely, a portion extending as deep as 0.5 μm or above from the sliding surface a, is formed only of the moisture-resistant conductive layer 26. In this embodiment, a portion of the front electrode 15A connected to the MR element 13 is formed only of the moisture-resistant conductive layer 26. The bias conductor 16 may be the same laminated metal layer as that forming the electrodes 15A and 15B. The front electrode 15A can readily be formed by a process comprising steps of sequentially forming the moisture-resistant conductive layer 26, the principal conductive layer 27 and the bonding metal layer 28 in that order in the shape of the electrode on the insulating layer 14 including a contact hole, etching a portion of the superposed bonding metal layer 28 contiguous with the sliding surface a and connected to the MR element 13, and a portion of the principal conductive layer 27 corresponding to that of the bonding metal layer 28 by ion milling using a resist mask, and stopping the etching operation upon the exposure of the moisture-resistant layer 26.

Thus, the front electrode 15A excluding a portion thereof contiguous with the sliding surface a is formed of the principal conductive layer 27 and the moisture-resistant layer, and only the moisture-resistant layer 26 of the front electrode 15A is exposed in the sliding surface a, the front electrode 15A exposed in the sliding surface a is not deteriorated by oxidation and corrosion even if the thin film head 25 is used under high-temperature, high-humidity conditions, so that the thin film head 25 maintains its high reliability.

Figure 10:
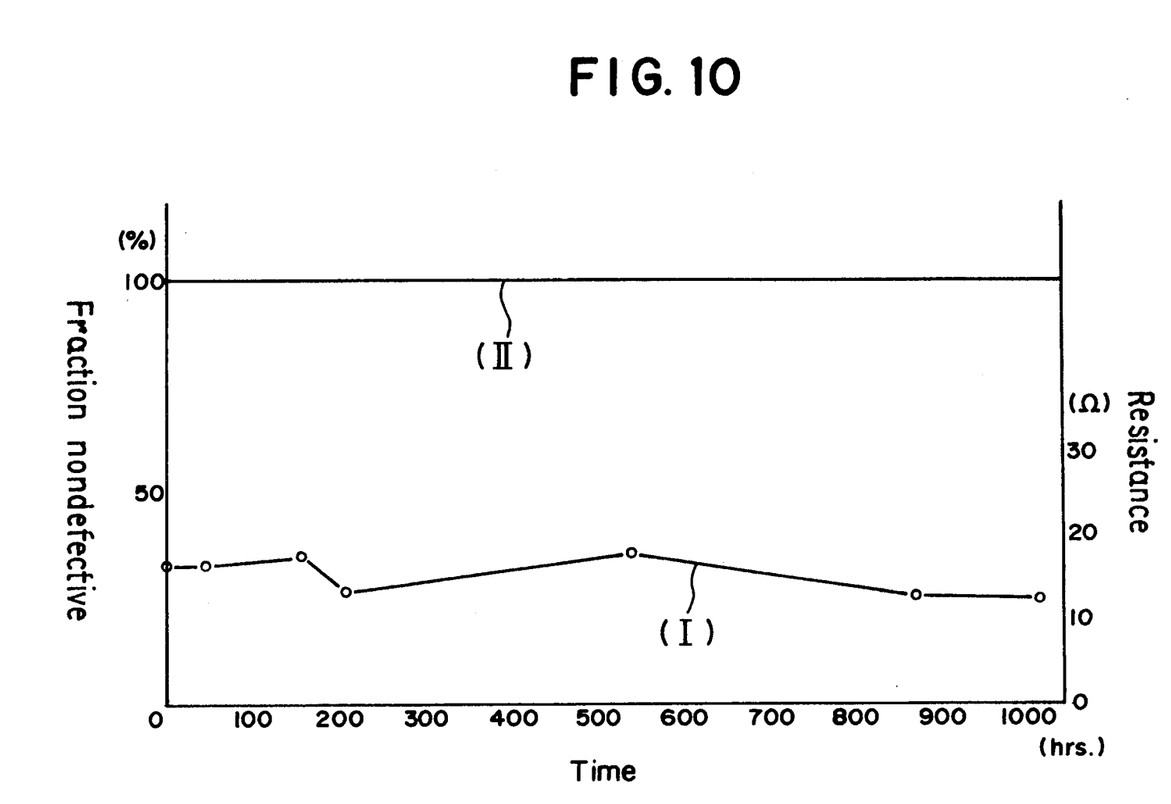
FIGS. 10 and 11 are graphs showing results of environmental tests of the thin film head in accordance with the present invention and a conventional thin film head, respectively.
Figure 11:
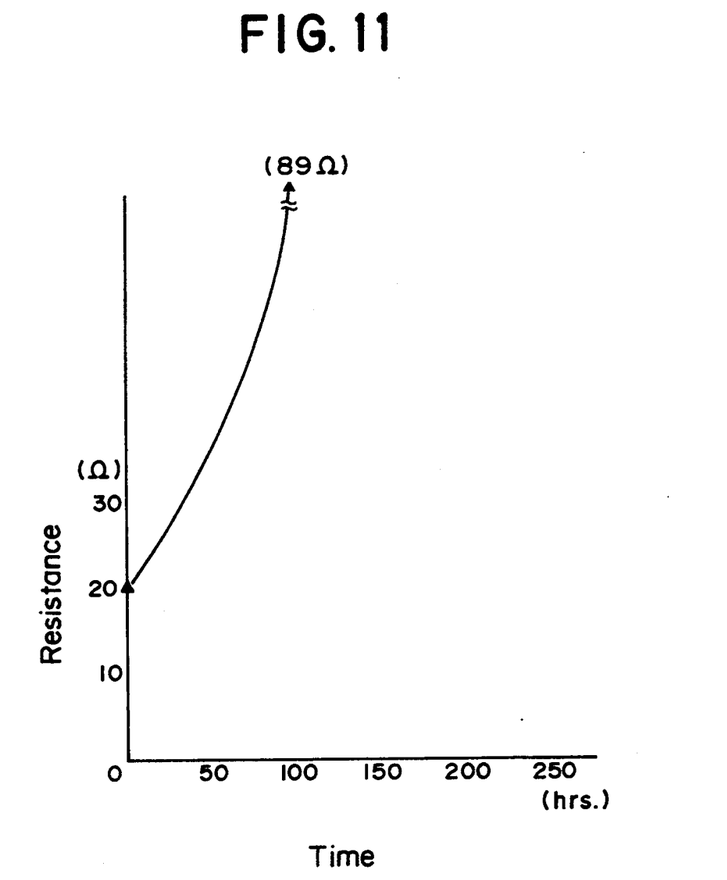

FIGS. 10 and 11 are graphs showing results of environmental tests respectively of the thin film head in the fourth embodiment according to the present invention provided with a Ti film as the moisture-resistant layer 26, and a conventional thin film head under high-temperature, high-humidity (temperature: 60° C., humidity: 90%) conditions. As is obvious from FIG. 11, the resistance of the MR element of the conventional thin film head between the electrodes increases sharply with time, which proves that the electrodes are deteriorated by corrosion. On the other hand, as indicated by a curve I in FIG. 10, the resistance of the MR element of the thin film head of the present invention between the electrodes remains substantially constant for a long time, which proves that the electrodes are not deteriorated. In FIG. 10, a straight line II indicates a fraction nondefective. As is obvious from FIG. 10, the thin film head of the present invention is capable of enduring long service under high-temperature, high-humidity conditions.

Naturally, the techniques applied to the thin film head 25 can be applied also to the thin film heads 11, 12 and 23.

Although the invention has been described as applied to a so-called single-shielded thin film head, naturally, the present invention is applicable also to a double-shielded thin film head provided with a MR element having upper and lower sides shielded magnetic shielding layers, respectively.

The gap of the magnetoresistance-effect thin film head in the first aspect of the present invention can readily be formed in a reduced size even if the MR element is formed in a reduced size to cope with high-density recording by forming a conductive layer so as to include a portion of the electrode connected to the MR element, and a portion of the bias magnetic field creating conductor. Such a construction of the magnetoresistance-effect thin film head enables the uniform application of a bias magnetic field to the MR element, reduces the number of external terminals, prevents layer short between the electrodes of the MR element and the bias magnetic field creating layer, and enhances the reliability of the magnetoresistance-effect thin film head.

The electrode having a portion contiguous with the sliding surface and formed of a moisture-resistant material employed as the front electrode of the MR element of the magnetoresistance-effect thin film head in the second aspect of the present invention is free from deterioration even if the magnetoresistance-effect thin film head is used under high-temperature, high-humidity conditions, which ensures the high reliability of the magnetoresistance-effect thin film head.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A magnetoresistance-effect thin film head comprising: a substrate; an elongate magnetic field sensing element provided on the substrate; an electrode layer having portions respectively extending from first and second opposite ends of the magnetic field sensing element to supply a sensing current to the magnetic field sensing element so that the sense current will flow in the direction of a signal magnetic field; an insulating layer formed over the magnetic field sensing element; a bias magnetic field creating conductor formed on the insulating layer so as to extend across the magnetic field sensing element; and a magnetic shielding layer formed over the magnetic field sensing element;

characterized in that the electrode layer consists of a laminated structure containing a principal conductive metal conductor and a moisture-resistant conductor, and a single portion of the electrode layer adjacent said first end of said sensing element is contiguous with the sliding surface and said single portion is formed only of the moisture-resistant conductor.

* * * * *